Patented Aug. 8, 1950

2,517,993

UNITED STATES PATENT OFFICE 2,517,993

HYDRAULIC CEMENT COMPOSITIONS

Louis L. Falco, New Haven, Conn., assignor to The Dextone Company, New Haven, Conn., a corporation of Connecticut No Drawing. Application December 23, 1946, Serial No. 718,103

3 Claims. (Cl. 106—86)

This invention relates to hydraulic cement compositions, and, while not limited thereto, the invention is particularly directed to a composition used in the manufacture of molded bath tubs.

Where the article is used as a bath tub, the ordinary hydraulic cement mixture is unsuitable for several reasons, one of which is that the thermal shock, caused, for example, by the introduction of hot water into the tub, causes cracking, and where a crack occurs the tub has to be discarded. Another objection to the ordinary cement mixture as used for such a purpose is the heaviness and massiveness of the article and its low tensile strength.

With a view to overcoming these drawbacks, I provide a novel hydraulic cement mixture, as hereinafter described. In this mixture I employ a light-weight aggregate of a suitable kind, which, with the other ingredients, provides a composition having the required characteristics. I may use a cellular aggregate, which is a burnt shale and which weighs approximately 90 pounds per cubic foot, or I may use an aggregate, which is a burnt slag from blast furnaces and which weighs approximately 95 pounds per cubic foot, or I may use expanded slag. These are light-weight material of cellular structure having a series of tiny air cells the walls of which are vitrified. For increasing the resistance to thermal shock and increasing the tensile strength of the mixture, I use wood fiber, preferably having a length of about one inch, and preferably the fiber used is cottonwood fiber, which is preferred because of the fact that it is free of tannic acid and is compatible with hydraulic cement and the other ingredients.

A further ingredient of the composition is a siliceous material, and the preferred siliceous material is fly ash, because this combines especially well with the other ingredients while at the same time reducing to a minium the weight of the siliceous component. I may, however, use as a substitute for the fly ash a fine sand of good quality.

A further component of the mixture is a waterproofing material. Here it is necessary to provide a material that is compatible with the hydraulic cement and reduces the absorption of water into the mixture to the required degree, For this purpose I use a liquid waterproofing agent comprising butyl stearate and mineral spirits, mixed preferably in substantially equal proportions. This is the preferred waterproofing agent because of the fact that it meets the conditions above mentioned.

The following are examples of compositions which are suitable for the purpose.

Example 1

94 lbs. of Portland cement
103 lbs. of burnt shale having a size of ½ inch to dust mesh and weighing approximately 90 lbs. per cubic foot.
4½ lbs. of cottonwood fibers of about one-inch length
20 lbs. of fly ash of 200 mesh.
1 pt. of butyl stearate and mineral spirits mixed in substantially equal proportions
6 gal. of water In manufacturing a bath tube the first four ingredients named are placed in a suitable mixer, the waterproofing agent and the water are added, and the mass is mixed by agitation for a period of from three to four minutes. The mixture is then placed in a form or mold having the required shape and permitted to dry for a period of from fourteen to sixteen hours. After this relatively short drying period the article is taken out of the form and is ready for use.

Example 2

94 lbs. of Portland cement
120 lbs. of burnt slag of size ½ inch to dust mesh and weighing approximately 95 lbs. per cubic foot
4½ lbs. of cottonwood fibers of about one-inch length
70 lbs. of 60-mesh sand
1 pt. combination of butyl stearate and mineral spirits in substantially equal proportions
6 gal. of water The procedure in mixing is substantially as described above in connection with Example 1. In this particular case sand is used in place of fly ash, and it will be noted that a substantially greater weight of sand is required than in the case of fly ash.

These are examples of compositions which are admirably suited for the manufacture of bath tubs because of the high resistance to thermal shock and the relatively high tensile strength. For increasing the resistance to thermal shock, the wood fibers are used, and it is important to note that the light aggregate employed is not a good conductor of heat, for which reason the liability of cracking of the tub wall through sudden temperature changes is substantially decreased. The tub is of light weight because of the selection of the materials, and because of the fact that a massive wall is not required owing to the high tensile strength of the composition. The waterproofining agent above mentioned reduces the absorption of water into the composition to a low percentage, so that after the article has dried out for a period of twenty-eight days, the water content will not be in excess of two per cent.

In each of Examples 1 and 2, I can substitute an equal weight of three-quarter inch excelsior fibers for the cottonwood fibers, and the wood fibers, namely the cottonwood fibers or the excelsior fibers, before incorporation in the mixture, can be impregnated with a suitable resin solution for imparting added strength and toughness. Also, if desired, resinous materials can be added to the mix itself for imparting additional strength.

Before the bath tubs are used their inner faces can advantageously be coated with high-baked synthetic enamel, and this may be applied in three separate coats. Tubs so coated have been thoroughly tested for resistance to thermal shock. With the tubs at room temperature, hot water was run in at various depths and up to the overflow, emptied, cooled back to room temperature, and refilled with the hottest water available, namely 206° F. This water, after remaining in the tubs for thirty-five minutes, was then emptied out, and the tubs immediately filled with water at 52° F., which was allowed to remain in the tubs for ten minutes. The high resistance to thermal shock was demonstrated by the fact that in such a test no cracks or other injuries to the enamel coatings were visible.

The fly ash used in making the tubs was a product obtained by electrical precipitation in the burning of powdered coal. Fly ash is a very finely divided product, much finer than Portland cement, and is mostly composed of silica. It is pozzuolanic in action, forming with lime an hydraulic cement, and combining with free lime which is liberated upon the hydration of the Portland cement used in the above-mentioned mixture. Fly ash also has the property of filling in the very small pores which would otherwise remain in the final product. The finished surface of the tub is smooth and continuous and can take several coats of synthetic enamel, which coats can be baked at temperatures up to 350° F. The bath tubs tested in the manner previously described were full-size tubs having a wall thickness of approximately one inch.

What I claim is:

1. An hydraulic cement composition comprising 94 lbs. of Portland cement, 103 lbs. of cellular aggregate of burnt shale of a size of ½ inch to dust mesh and weighing approximately 90 lbs. per cubic foot, 4½ lbs. of cottonwood fibers of about one-inch length, 20 lbs. of fly ash of 200 mesh, 1 pt. of butyl stearate and mineral spirits mixed in substantially equal proportions, and 6 gal. of water.

2. A hydraulic cement composition comprising, by weight, about 94 parts of Portland cement, about 103 to 120 parts of light-weight aggregate selected from the group consisting of vitrified shale and vitrified slag, about 4½ parts of wood fibers of about one inch length, about 20 to 70 parts of a siliceous material selected from the group consisting of fly ash and sand, and a small amount of waterproofing agent comprising butyl stearate.

3. A cement according to claim 2 wherein the wood fibers are cottonwood fibers.

LOUIS L. FALCO.

REFERENCES CITED

The following references are of record in the file of this patent:

UNITED STATES PATENTS

| Number | Name | Date |
| --- | --- | --- |
| 1,344,058 | Nilsson | June 22, 1920 |
| 1,961,525 | Offutt | June 5, 1934 |
| 2,085,793 | Coss | July 6, 1937 |
| 2,250,107 | Nelles | July 22, 1941 |
| 2,358,776 | Goldstein | Sept. 26, 1944 |